Sept. 21, 1954  A. C. LOVESEY  2,689,680
MEANS FOR REGULATING THE CHARACTERISTICS
OF MULTISTAGE AXIAL-FLOW COMPRESSORS
Filed June 15, 1950  3 Sheets-Sheet 1
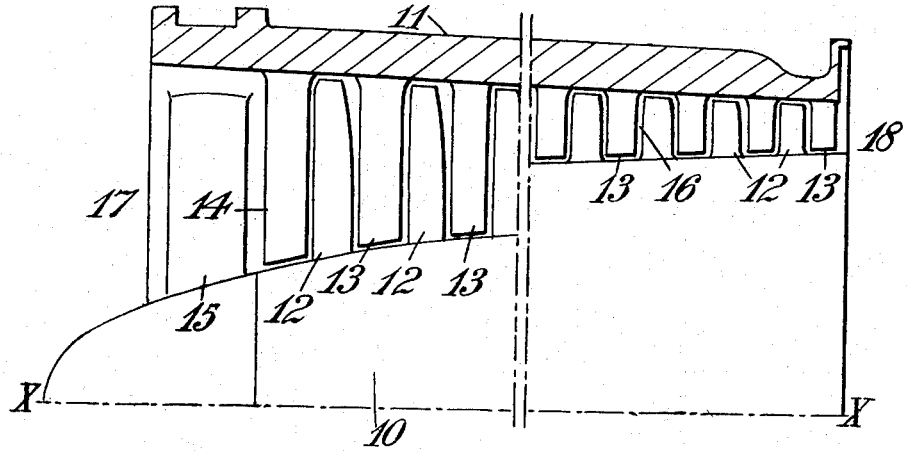
Fig. 1.
Fig. 2.
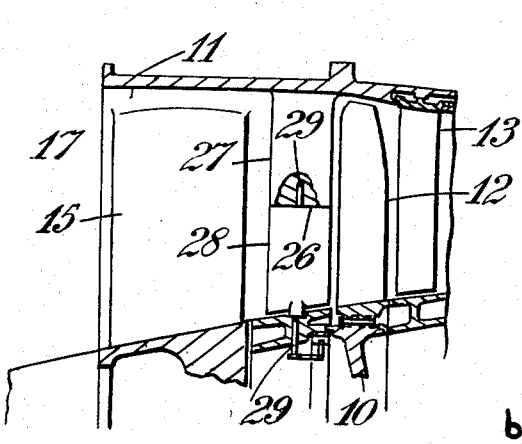
INVENTOR
ALFRED C. LOVESEY
by Wilkinson Mawhinney
Attys.

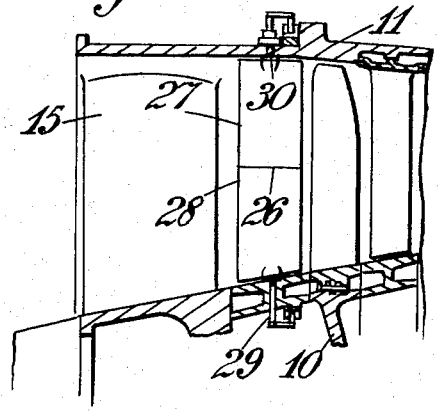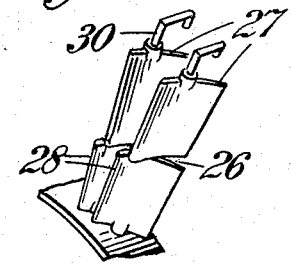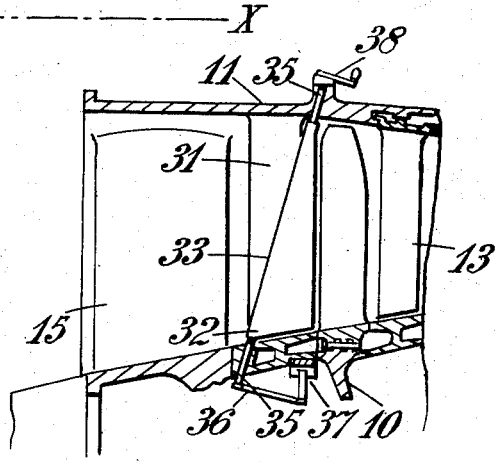

Sept. 21, 1954     A. C. LOVESEY     2,689,680
MEANS FOR REGULATING THE CHARACTERISTICS
OF MULTISTAGE AXIAL-FLOW COMPRESSORS
Filed June 15, 1950     3 Sheets-Sheet 3
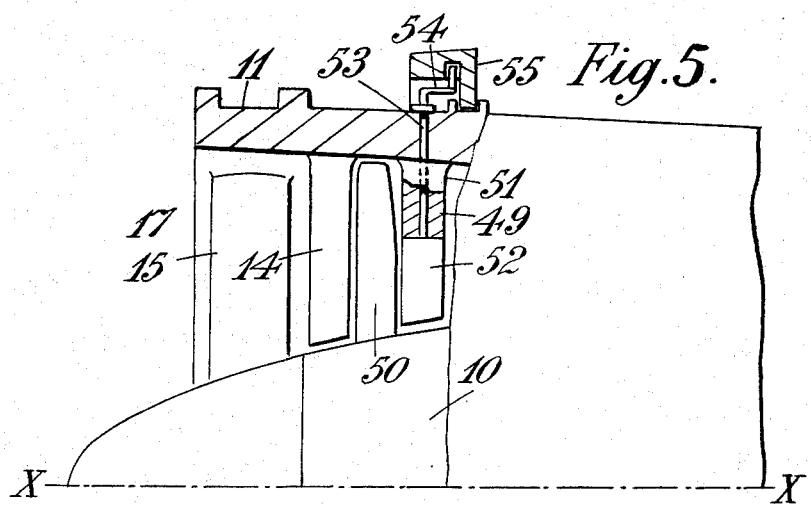
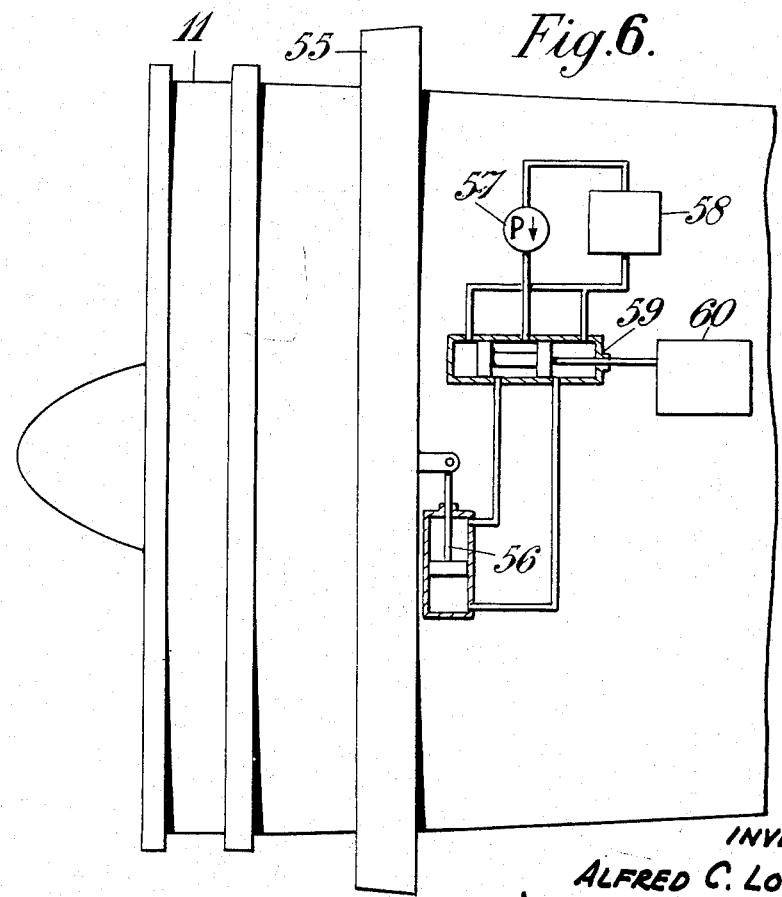
INVENTOR
ALFRED C. LOVESEY
by Wilkinson Mawhinney
Attys.

Patented Sept. 21, 1954

2,689,680

UNITED STATES PATENT OFFICE 2,689,680

MEANS FOR REGULATING THE CHARACTERISTICS OF MULTISTAGE AXIAL-FLOW COMPRESSORS

Alfred Cyril Lovesey, Littleover, England, assignor to Rolls-Royce Limited, Derby, England, a British company Application June 15, 1950, Serial No. 168,253

Claims priority, application Great Britain June 16, 1949

5 Claims. (Cl. 230—114)

This invention relates to multi-stage axial flow compressors which comprise two relatively rotating bodies, hereinafter referred to as a stator and a rotor. One only of said bodies may rotate or alternatively both may rotate in opposite directions. The invention has for its object to provide a means of regulating the characteristics of the compressor in a desirable manner over a wide range of operating conditions.

The invention has special importance in relation to multi-stage axial flow compressors of the high compression ratio kind, such as are, for example, used in gas-turbine engines for aircraft, where it is desired to design the compressor to operate at high efficiency, particularly in the upper portion of the speed range, corresponding to medium or cruise power and maximum power conditions.

It is usual to design such a compressor to obtain efficient operation at a particular speed, or at a particular value of a condition, such as compression ratio, which is dependent upon speed, and such design involves the matching of the blade characteristics, including incidence and profile, to maintain a desired flow condition within the compressor, at such particular speed or condition.

For example, the compressor may be designed so as to maintain a constant mean axial velocity of the working medium from the inlet to the outlet of the compressor at a particular rotational speed of the compressor rotor, at a particular compression ratio, or at a particular corrected rotational speed of the compressor rotor. In order to give such conditions the shape of the compressor duct, i. e. the annular passage from the inlet to the outlet of the compressor, and the incidence and shape of the blading are chosen appropriately, which results in the compressor duct converging as from inlet to outlet, the reduction in cross sectional area of the duct of the compressor compensating for the increasing density of the working medium as it passes through the stages.

The annular duct will usually converge continuously from inlet to outlet, but it may have a parallel sided portion, or even a slightly divergent portion, the actual design being such as to give a desired, usually a constant, axial velocity of flow at each cross-section of the passage at a certain design condition.

As previously mentioned it is usual to choose a cruise or maximum power condition of running as the design condition for efficient operation; at speeds below that corresponding to the design condition, when the pressure rise per stage is less than the designed pressure rise, there will tend to be an accelerating axial flow of the working medium from inlet to outlet of the compressor duct due to the overall density ratio being reduced compared with that at the particular design condition. This acceleration appears as a reduction of the axial velocity of the working medium at inlet and an increase of axial velocity at outlet compared with those at the particular design condition.

The blade incidence and shape, being appropriately matched to maintain efficient operation of the compressor at the design speed, are incorrectly matched to maintain such operation at lower speeds and further, particularly where the compressor is designed to operate at a high compression ratio, e. g. at 5 to 1, very serious difficulties are encountered in maintaining running at relatively slow speeds. Such difficulties, which are well known in the art, are attributable to the stalling of blades in the inlet stages of the compressor, due to the reduced axial velocity component of the working medium, which stalling may result in a complete breakdown of flow conditions in the compressor duct.

Hitherto, it has been proposed that such difficulties should be overcome by the provision of means for adjusting the angular position of the stator blades or of the rotor blades, or of both, particularly in the inlet stages, for the purpose of varying the rotational swirl of the working medium in these stages appropriately to avoid the stalling characteristic mentioned.

Another proposal has been that valve means should be provided for bleeding off a quantity of the working medium at a stage intermediate between the inlet and outlet of the compressor. This arrangement provides for the maintenance of the axial velocity of the working medium in the low pressure stages of the compressor, at a value approximately equal to that for the design condition without increasing axial velocity in the latter stages. The system, whilst providing certain desirable characteristics, clearly results in undesirable losses, and further involves installation and control problems.

It will be appreciated that the problems outlined above are aggravated when the compressor is designed for high compression ratios, as the convergence of the compressor duct then becomes particularly marked; also in the use of high performance multi-stage axial flow compressors in aircraft gas-turbine engines, the problem is further aggravated by the desirability of obtaining efficient operation in a very wide range of rotational speed and of altitude or intake pressure.

The main object of the present invention is to provide a novel construction of multi-stage axial-flow compressor in which the problems outlined above may be mitigated by adjusting, on change of rotor speed, the ratio, at the inlet of the compressor, of swirl velocity to axial velocity of the working fluid to a greater extent adjacent the inner wall of the compressor duct than the extent if any to which it is adjusted adjacent the outer wall of the compressor duct.

The invention may be more readily understood from the following description in which reference is made to the accompanying drawings, of which:

Figure 1 is a sectional elevation of a compressor of the kind with which the present invention is concerned, Figures 2 and 3 each show a portion at the inlet of a compressor which embodies the invention, Figure 3a shows a pair of inlet guide vanes used in the compressor shown in Figure 3.

Figures 4 and 5 each show a portion at the inlet of a compressor which embodies the invention, and Figure 6 shows the operating means employed in the compressor shown in Figure 5.

Referring to Figure 1, the reference numeral 10 indicates the rotor-drum of the compressor which is mounted for rotation about the axis X—X and together with the stator casing 11, provides the walls of the compressor duct 1. The compressor is a multi-stage compressor, each stage comprising a row of rotor-blades 12, mounted on the rotor drum 10 for rotation therewith, and a row of stator-blades 13 mounted on the casing 11. The compressor is also provided with a row of fixed guide-vanes 14 mounted in the inlet 17 of the compressor duct 16 upstream of the first row of rotor-blades 12.

The rotor-drum 10 is mounted on a shaft (not shown) which, at the inlet end of the compressor is mounted in a bearing (not shown) carried by support webs 15 which extend across the inlet 17 of the compressor-duct 16 from the stator-casing 11.

The compressor is designed to give a compression ratio of 5:1 at a selected rotational speed, and the compressor-duct 16 is dimensioned to give a constant axial velocity of the working fluid from the inlet 17 to the outlet 18 at the selected rotational speed. As a result, the cross-sectional area of the compressor duct 16 is greater at the inlet 17 than it is at the outlet 18, i. e. the compressor duct converges as from inlet to outlet.

Since the incidence and shape of the rotor-blades 12 and stator-blades 13 are appropriately matched to give efficient operation at the selected rotational speed, they are inappropriately matched for operation at other speeds; and serious difficulties are encountered in maintaining steady operation of the compressor at rotational speeds which are low compared with the selected speed. Such difficulties, which are well known in the art, are attributable, at least in part, to the reduced axial velocity of the working fluid through the inlet stages of the compressor, which is liable to result in stalling of the compressor-blades in these stages, which in turn may result in a complete breakdown of flow conditions in the compressor-duct.

In constructions of multi-stage axial-flow compressors according to the present invention, these well known drawbacks are mitigated by increasing, when stalling is likely to occur, the ratio of swirl velocity to axial velocity of the working fluid passing through an inlet row of stator blades (i. e. a row of stator blades upstream of a row of rotor blades which is liable otherwise to stall when the rotational speed is low) to a greater extent adjacent the inner wall of the compressor duct than the extent of the increase, if any, in such ratio adjacent the outer wall of the compressor duct.

By doing this, two results are achieved. Firstly, the axial velocity of the working fluid adjacent the outer duct wall is increased, as compared with a similar compressor in which the invention is not employed operating at the same speed, so that the flow conditions adjacent the outer duct wall approach the design conditions more closely and the likelihood of stalling adjacent the outer duct wall is reduced. Secondly the direction of motion of the working fluid relative to the succeeding row of rotor blades is adjusted adjacent the inner duct wall to provide adequate compensation for the reduction in axial velocity of the working fluid, and so reduce the likelihood of stalling adjacent the inner duct wall as well.

Figure 2 shows one embodiment of the invention in which the inlet guide vanes are each made in two portions 27, 28, being split chord-wise at 26. The radially outer portion 27 of each vane is fixed in the compressor casing 11, whilst the radially inner portion 28 is carried by trunnions 29 so as to be adjustable by rotation about an axis radial to the axis X—X. Preferably the radially inner portions of all the guide vanes are interconnected for simultaneous adjustment.

Thus, adjustment of the radially inner portions 28 of the guide vanes to increase their outlet angle when the rotational speed of the compressor is low, will cause the ratio of swirl velocity to axial velocity of air passing the guide vanes to be increased adjacent the inner duct wall; while such ratio adjacent the outer duct wall will not be affected since the radially outer portions 27 are fixed, although the axial velocity will be increased.

Figures 3 and 3a illustrate another embodiment of the invention which is similar to that shown in Figure 2 except that the radially outer portions 27 of the guide vanes are adjustable about the same axis as, but independently of, the radially inner portions 28. This enables the ratio of swirl velocity to axial velocity of air passing the inlet guide vanes also to be increased adjacent the outer duct wall if found desirable to remove the likelihood of stalling. However the extent of the adjustment adjacent the outer duct wall will not be as great as the extent of the adjustment adjacent the inner duct wall.

Figure 4 illustrates another embodiment of the invention in which each inlet guide vane 14 is made up of two parts 31, 32 split along a diagonal 33 from the leading edge adjacent the inner duct wall to the trailing edge adjacent the outer duct wall. The leading part 31 is anchored to the compressor casing 11, and the trailing part 32 is mounted on trunnions 35 to be angularly adjustable about the axis 33 which extends radially of the axis of rotation X—X.

The guide vane 14 shown in Figure 4, in addition to being interconnected to the other guide vanes by means of the crank 36 and ring 37 located inside the inner duct wall, is also provided with a crank 38 for operation externally of the compressor casing 11. Operation of the crank 38 causes the other crank 36 to turn, and the other guide vanes are caused to be adjusted by the ring 37, so that only one guide vane need be provided with an external crank 38.

Another embodiment of the invention is illustrated in Figure 6. In this case the stator blades 49 which are adjustable in accordance with the invention, are immediately downstream of the first row of rotor blades 50 (i. e. the adjustable stator blades are the first stage of stator blades proper). Each of the stator blades is made in two parts, the radially outer of which 51 is fixed in the compressor casing 11 which provides the outer duct wall. The radially inner part 52 is mounted on a trunnion 53 which extends through the radially outer part 51 and the casing 11 and lies substantially radially of the axis of rotation X—X. At its outer end, the trunnion 53 is interconnected with those of the other blades in the stage by means of its crank 54 and the ring 55, so that the radially inner portions 52 of all the blades can be adjusted simultaneously to increase their outlet angles.

The adjustment of the outlet angle of the stator blades in an inlet stage may be carried out progressively so that the outlet angle decreases gradually from its maximum value as the speed of the compressor increases. Alternatively the adjustment may be made from one outlet angle to a second when the speed, or some operating condition which varies with the speed, passes through a selected value; the outlet angle being decreased when the selected value is passed through on increase of speed and vice versa.

Figure 6 shows one way in which the adjustable blades of Figure 5 may be adjusted from a first position to a second and vice versa, when the value of an operating variable, which varies with the speed of the compressor, passes through a selected value. As shown in Figure 6, the ring 55 is connected to be rotated about the axis X—X by the hydraulic ram 56 to which operating fluid is supplied by the pump 57 from the reservoir 58 through the control valve 59. The control 59 is connected to a device 60 which is sensitive to an operating variable of the compressor which varies with speed (e. g. speed, compressor delivery pressure or compression ratio). When the value of the operating variable is less than selected value, the pump 57 is connected to supply one end of the ram 56; but when the value exceeds the selected value, the pump is connected to supply the other end. Thus, on passing through the selected value, the ends of the ram 56 supplied by the pump 57 are changed and the ring 55 moves from one position to another.

The ram 56 and pump 57 are so connected that when the operating variable passes through the selected value due to an increase in speed, the resultant movement of the radially inner portions 52 decreases their outlet angle from a first value to a second value; and when the operating variable passes through the selected value on decrease of speed, the resultant movement of the radially inner portions 52 increases their outlet angle from the second value to the first value.

If progressive variation of the radially inner portions 52 with variation of the operating variable were desired, the control valve 59 and ram could be interconnected through a follow-up device so that position of the ram would be dependent on the position of the valve and hence on the value of the operating variable.

I claim:

1. A multi-stage axial-flow compressor having an inner duct wall and an outer duct wall defining an annular compressor duct between them, and an inlet row of stator blades each of which extends the whole way across said compressor duct and each of which comprises a plurality of relatively adjustable parts mounted for relative adjustment about an axis substantially radial to the axis of rotation of the compressor.

2. A compressor according to claim 1 wherein each said stator blade has a radially inner part and a radially outer part, said radially inner part, at least, being angularly adjustable by rotation about an axis substantially radial to the axis of rotation of compressor and said parts having adjacent bounding surfaces extending from the leading edge of the blade to the trailing edge thereof at right angles to said radial axis.

3. A compressor according to claim 2 wherein said radially outer part of each of said stator blades is angularly adjustable about the same axis as said radially inner part in the same direction as, but to a less extent than, said radially inner part.

4. A compressor according to claim 1 wherein each said stator blade comprises a leading part and a trailing part, said parts having adjacent bounding surfaces extending from the leading edge of the blade adjacent said inner duct wall to the trailing edge of the blade adjacent said outer duct wall, and having said trailing part mounted for angular adjustment about an axis extending from the leading edge of the blade adjacent said inner duct wall to the trailing edge of said blade adjacent said outer duct wall.

5. A multi-stage axial-flow compressor having an inner duct wall and an outer duct wall defining an annular compressor duct between them, an inlet row of stator blades, each of which extends the whole way across said compressor duct and each of which comprises a plurality of relatively adjustable parts mounted for relative adjustment about an axis substantially radial to the axis of rotation of the compressor and means to adjust said relatively adjustable parts which means includes a control device sensitive to an operating variable of the compressor which varies with the speed of the compressor rotor; which control device is arranged to cause relative movement between the adjustable parts of each blade from a first position to a second position at which the outlet angle of the part of each blade having the greater chordal area adjacent the inner duct wall is less than at said first position, said movement being caused when said operating variable passes through a selected value on increase of the speed of the compressor rotor, and said control device being arranged to cause relative movement between the adjustable parts of each blade from the second position to the first position when said operating variable passes through the selected value on decrease of the speed of the compressor rotor, the actual movement of the part of each blade having the greater chordal area adjacent the inner duct wall during movement from said first position to said second position and vice versa being greater than the actual movement of any other part of the same blade.

References Cited in the file of this patent

UNITED STATES PATENTS

| Number | Name | Date |
|---|---|---|
| 2,382,535 | Bauer | Aug. 14, 1945 |
| 2,388,208 | Foss | Aug. 30, 1945 |
| 2,397,060 | Szydlowski | Mar. 19, 1946 |
| 2,434,678 | Szczeniowski | Jan. 20, 1948 |
| 2,460,778 | Willgoos | Feb. 1, 1949 |
| 2,473,329 | Candler | June 14, 1949 |
| 2,500,070 | Hagen | Mar. 7, 1950 |

FOREIGN PATENTS

| Number | Country | Date |
|---|---|---|
| 586,565 | Great Britain | Mar. 24, 1947 |